United States Patent
Markiton et al.

(10) Patent No.: US 7,702,428 B2
(45) Date of Patent: Apr. 20, 2010

(54) METHOD AND DEVICE TO ASSIST IN THE PILOTING OF AN AIRCRAFT

(75) Inventors: Vincent Markiton, Fontenilles (FR); François Barre, Plaisance du Touch (FR)

(73) Assignees: Airbus France, Toulouse (FR); Airbus, Blagnac (FR)

( * ) Notice: Subject to any disclaimer, the term of this patent is extended or adjusted under 35 U.S.C. 154(b) by 321 days.

(21) Appl. No.: 11/651,624

(22) Filed: Jan. 10, 2007

(65) Prior Publication Data

US 2007/0279254 A1 Dec. 6, 2007

(30) Foreign Application Priority Data

Jan. 11, 2006 (FR) .................................. 06 00246

(51) Int. Cl.
*G05D 1/04* (2006.01)
*G08G 5/02* (2006.01)

(52) U.S. Cl. .................. 701/5; 701/4; 701/8; 701/9; 701/16; 701/18; 340/970; 340/977

(58) Field of Classification Search .............. 701/6–11, 701/202, 205–211, 16; 340/947, 970, 977; 244/3.15
See application file for complete search history.

(56) References Cited

U.S. PATENT DOCUMENTS

| | | | | |
|---|---|---|---|---|
| 3,604,908 A * | 9/1971 | Loome et al. ................. 701/18 |
| 4,121,246 A * | 10/1978 | Fadden et al. ................ 348/117 |
| 4,330,827 A * | 5/1982 | Kettler ......................... 701/16 |
| 4,792,906 A * | 12/1988 | King et al. ...................... 701/5 |
| 5,820,080 A * | 10/1998 | Eschenbach ................. 244/183 |
| 6,317,663 B1 | 11/2001 | Meunier et al. |
| 6,438,469 B1 * | 8/2002 | Dwyer et al. ................... 701/16 |
| 7,330,781 B2 * | 2/2008 | Artini et al. .................... 701/16 |
| 2003/0016160 A1 | 1/2003 | Lok et al. |
| 2005/0261812 A1 | 11/2005 | Artini et al. |
| 2006/0004496 A1 * | 1/2006 | Tucker et al. ................... 701/4 |
| 2006/0253232 A1 * | 11/2006 | Gerrity et al. ................. 701/16 |

FOREIGN PATENT DOCUMENTS

| EP | 0989386 | 3/2000 |
|---|---|---|
| EP | 1600734 | 11/2005 |
| WO | 20040095394 | 11/2004 |

OTHER PUBLICATIONS

Federal Aviation Administration, Airplane Flying Handbook FAA-H-8083-3A, 2004.*

(Continued)

*Primary Examiner*—Thomas G Black
*Assistant Examiner*—Peter D Nolan
(74) *Attorney, Agent, or Firm*—Dickinson Wright PLLC

(57) ABSTRACT

A device to assist in an independent piloting of an aircraft at least in a descent phase includes a unit to determine a descent axis which assists a pilot in flying from a safe altitude to a decision height, the descent axis being secured relative to the ground being flown over, and a guidance system to assist in the guiding of the aircraft along said descent axis in a descent phase.

6 Claims, 4 Drawing Sheets

OTHER PUBLICATIONS

Joint Chiefs of Staff, Joint Tactics, Techniques, and Procedures for Theater Airlift Operations Joint Pub 3-17, 1995.*
J.A. Adam, "How to design an 'invisible' aircraft," IEEE Spectrum, vol. 25, No. 4, April, pp. 26-31, 1988.*
Federal Aviation Administration, "Section 4: AMS Safety Risk Management Principals," Federal Aviation Administration, 2004. [Online]. Available: http://fast.faa.gov/archive/v0105/toolsets/SafMgmt/section4.htm. [Accessed: May 15, 2009].*
J.A. Adams, "How to design an 'invisible aircraft," IEEE Spectrum, vol. 25, No. 4, April, pp. 26-31, 1988.*

* cited by examiner

METHOD AND DEVICE TO ASSIST IN THE PILOTING OF AN AIRCRAFT

BACKGROUND OF THE INVENTION

The present invention relates to a method and a device to assist in the piloting of an aircraft, in particular a military transport aircraft, to assist in an independent piloting of the aircraft at least in a descent phase between a safe altitude and a decision height that are predetermined.

DESCRIPTION OF THE PRIOR ART

In the context of the present invention, it is assumed that the piloting is independent when it is carried out using positioning means that are exclusively means on board the aircraft, and in a particular a satellite positioning system, for example of the GPS (global positioning system) type, an inertial unit, and barometric sensors.

Furthermore, in the context of the present invention, it is assumed that:
  the safe altitude is a predetermined altitude, from which the risk of collision of the aircraft with the ground being flown over presents a zero or very low probability, for example $10^{-9}$; and
  said decision height is a non-zero height, which is located under said safe altitude, and for which the pilot must engage the aircraft in a particular maneuver, normally manually in visual flight, for example to perform a flight at low altitude.

If the aircraft is in flying conditions of the VMC (visual meteorological conditions) type at the safe altitude, the pilot can have said aircraft flown in visual flight mode, manually, from said safe altitude to the decision height.

However, if such visual meteorological conditions do not exist at said safe altitude, for example when clouds are located between the safe altitude and the decision height, it is not possible for the pilot, for obvious reasons of safety, to have the aircraft fly in visual flight mode manually from said safe altitude to said decision height, because of the excessively high risk of collision with the ground being flown over. Furthermore, in the context of the present invention, since the aircraft must carry out an independent descent, in particular in the military field in order not to be detected, it is not possible to use auxiliary location means such as radars, for example, which are likely to be detected from the ground.

SUMMARY OF THE INVENTION

The object of the present invention is to remedy these drawbacks. It concerns a method to assist in the piloting of an aircraft, in particular a military transport aircraft, to assist in an independent piloting of this aircraft at least in a descent phase between a predetermined safe altitude and a predetermined decision height.

To this end, according to the invention, said method is noteworthy in that:
a) there is determined, exclusively using information available on board the aircraft, a descent axis making it possible to fly from the safe altitude to the decision height, and where appropriate, a reascent axis making it possible to fly from said decision height to said safe altitude, said descent and reascent axes being secured relative to the ground being flown over;
b) in said descent phase, the aircraft is guided along said descent axis to said decision height; and, where appropriate
c) at said decision height, if visual meteorological conditions are not verified, the aircraft is guided (preferably along said reascent axis) to said safe altitude.

Furthermore, if, at said decision height, said visual meteorological conditions are verified, the pilot of the aircraft continues the flight manually in said step c).

It will be noted that, in the context of the present invention, a (secured) reascent axis is not necessarily provided. In this case, if, at the decision height, the visual meteorological conditions are not verified, the pilot has the aircraft reascend straight ahead of him with a maximum thrust, and with the maximum gradient that the aircraft can fly at with this maximum thrust, and this to the safe altitude.

Thus, with the invention, all the part of the flight concerned (between the safe altitude and the decision height) is secured. In practice, in the descent phase, the aircraft is guided along said descent axis which is, by definition, secured relative to the ground being flown over, which means that it is formed so as to obtain a risk of collision with the ground that presents a very small probability, for example $10^{-9}$. Furthermore, at said safe altitude, the aircraft is either likely to be guided manually in visual flight mode (by the pilot) if the meteorological conditions allow the pilot sufficient visibility, or (otherwise) guided (for example along said reascent axis which is secured relative to the ground being flown over) to the safe altitude, at which there is no longer any danger of collision with the ground being flown over.

Advantageously, to determine said descent axis, in the step a), there are determined:
  a first anchoring point located on the ground;
  a first magnetic orientation; and
  a first gradient value.

Furthermore, advantageously, to determine said reascent axis, in the step a), there are determined:
  a second anchoring point located on the ground;
  a second magnetic orientation; and
  a second gradient value.

Moreover, to inform the pilot, there are presented to him in the descent phase, on at least one display screen:
  a first indication means indicating the actual implementation of said descent phase along said descent axis; and/or
  a second indication means indicating said decision height.

Furthermore, in one particular embodiment, in the step a), there is also determined a set-point speed at which the aircraft should fly at least along said descent axis, and in the step b), the aircraft is guided by making it fly at said set-point speed.

The present invention can be applied to various types of descent phases, and in particular to a descent phase intended to pass through cloud layers. However, in a preferred embodiment, said descent phase is an approach phase of a parachute drop trajectory, from which a parachute drop is to be carried out.

In this preferred embodiment, advantageously:
  said set-point speed is adapted to the speed required for the parachute drop that must be carried out from said parachute drop trajectory; and/or
  said decision height corresponds to the sum of the height of said parachute drop trajectory which is at constant altitude and a predetermined height margin; and/or
  in the descent phase, there is presented to the pilot of the aircraft, on at least one display screen, at least one additional indication means indicating the moment at which the crew must open doors and a parachute drop ramp of the aircraft for the purpose of the parachute drop.

The present invention also relates to a device to assist in the piloting of an aircraft, in particular of a military transport airplane, to assist in the independent piloting of said aircraft at least in a descent phase between a predetermined safe altitude and a decision height that is also predetermined.

According to the invention, said device is noteworthy in that it comprises:
- a set of information sources;
- data processing means for determining, exclusively using information obtained from said set of information sources that are mounted on board the aircraft, a descent axis making it possible to fly from the safe altitude to the decision height, and, where appropriate, a reascent axis making it possible to fly from said decision height to said safe altitude, said descent and reascent axes being secured relative to the ground being flown over;
- a guidance system to assist in the guiding of the aircraft:
  - along said descent axis, in said descent phase, and this to said decision height; and, where appropriate,
  - if visual meteorological conditions are not verified at said decision height at the end of the descent phase, as far as said safe altitude (preferably along said reascent axis); and, where appropriate
- manual piloting means making it possible for the pilot to guide the aircraft manually at least from the decision height, if visual meteorological conditions are verified at said decision height; and, where appropriate
- display means to present at least one indication means on at least one display screen.

BRIEF DESCRIPTION OF THE DRAWINGS

The figures of the appended drawing will clearly show how the invention can be implemented. In these figures, identical references denote similar elements.

DESCRIPTION OF THE PREFERRED EMBODIMENTS

Figure 1:
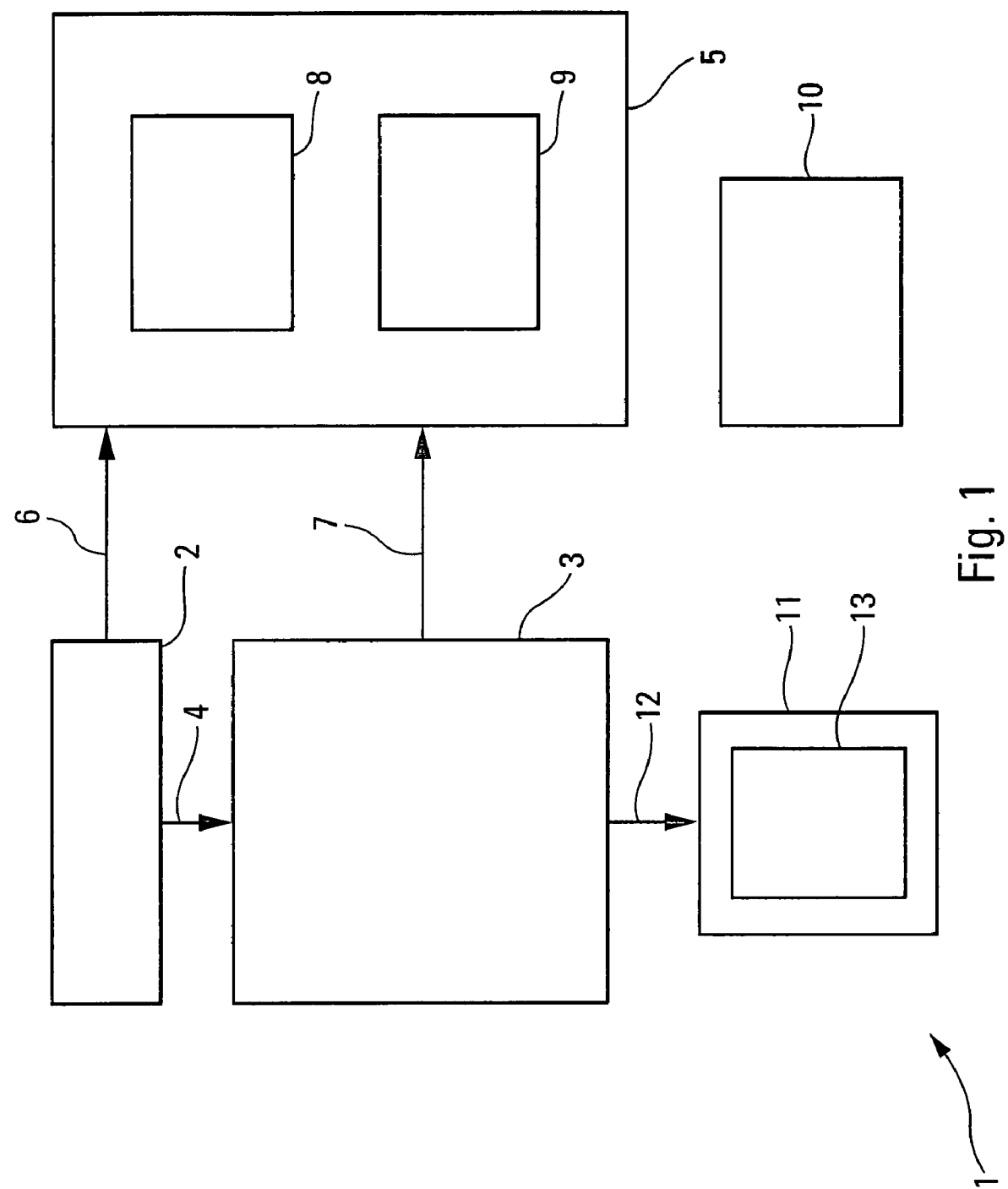
FIG. 1 is the block diagram of a device to assist in the piloting according to the invention.

The device 1 according to the invention and diagrammatically represented in FIG. 1 is intended to assist in the piloting of an aircraft A, in particular of a military transport airplane, at least in a descent phase between a safe altitude AS and a decision height HD, in particular in the absence of visual meteorological conditions between these two altitudes AS and HD, for example because of the presence of clouds N likely to form a cloud layer, reducing the visibility.

In the context of the present invention, it is assumed that:
- the safe altitude AS is an altitude, from which the risk of collision of the aircraft A with the ground T being flown over presents a zero or very low probability, for example $10^{-9}$. The safe altitude AS is determined according to the relief of the ground T being flown over, and this by geographic areas. The safe altitude AS defines the minimum altitude, at which the aircraft A can fly in instrument flight conditions of the IMC (instrument meteorological conditions) type in total safety with respect to the ground T; and
- said decision height HD is a non-zero height, which is located under said safe altitude AS, and for which the pilot must engage the aircraft A in a particular maneuver, normally manually in visual flight mode, for example to perform a flight at low altitude.

If the aircraft A needs to descend below this safe altitude AS, it needs to be in visual meteorological conditions for reasons of safety. Now, it is possible, for example, that clouds N exist between this altitude AS and the decision height HD, which form a cloud ceiling not engendering such visual meteorological conditions. The device 1 according to the invention is formed so as to assist in the piloting in such circumstances.

Figure 2:
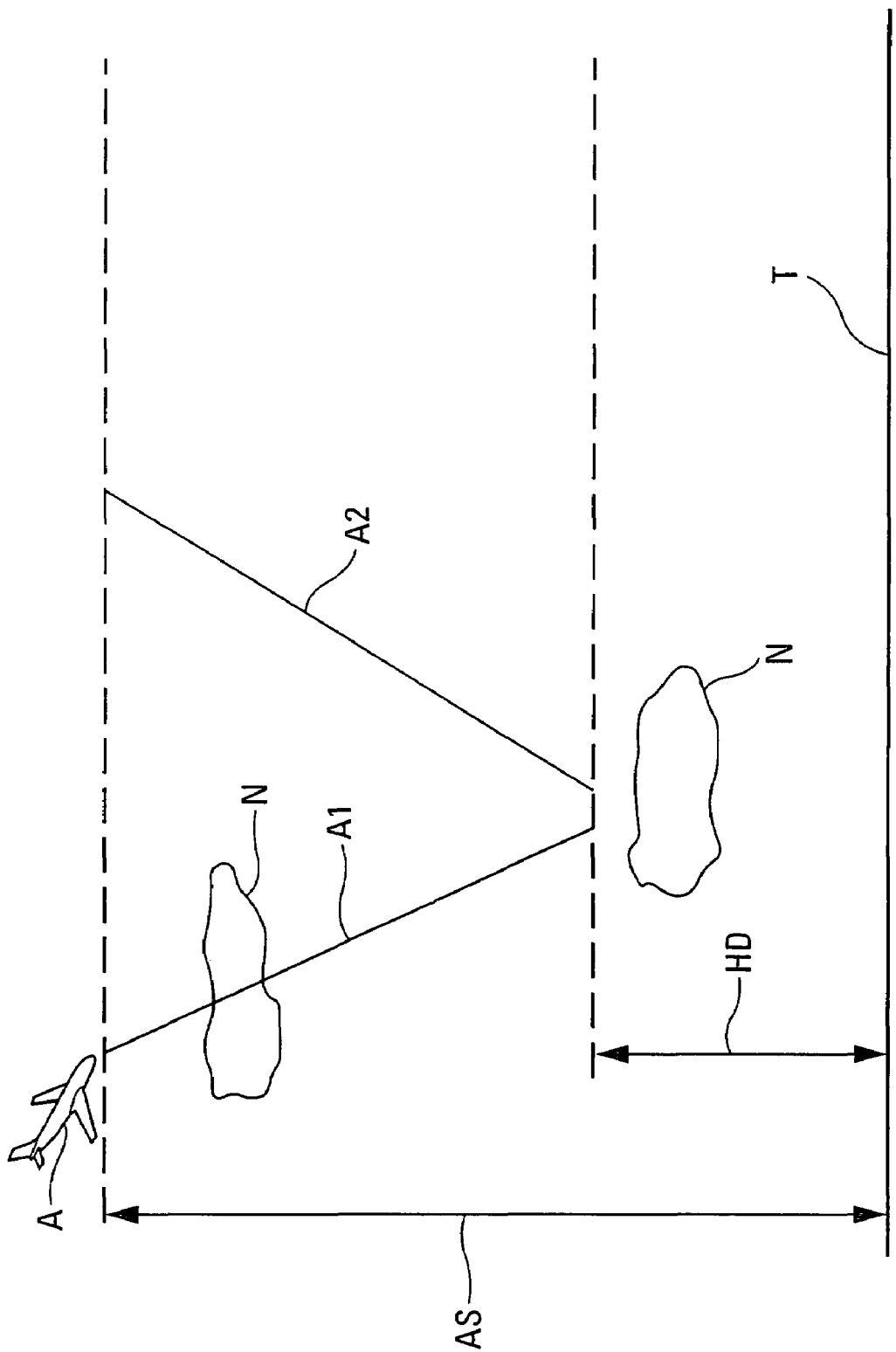
FIGS. 2 to 4 are graphs showing the advantages of the present invention, respectively in three different situations.
Figure 3:
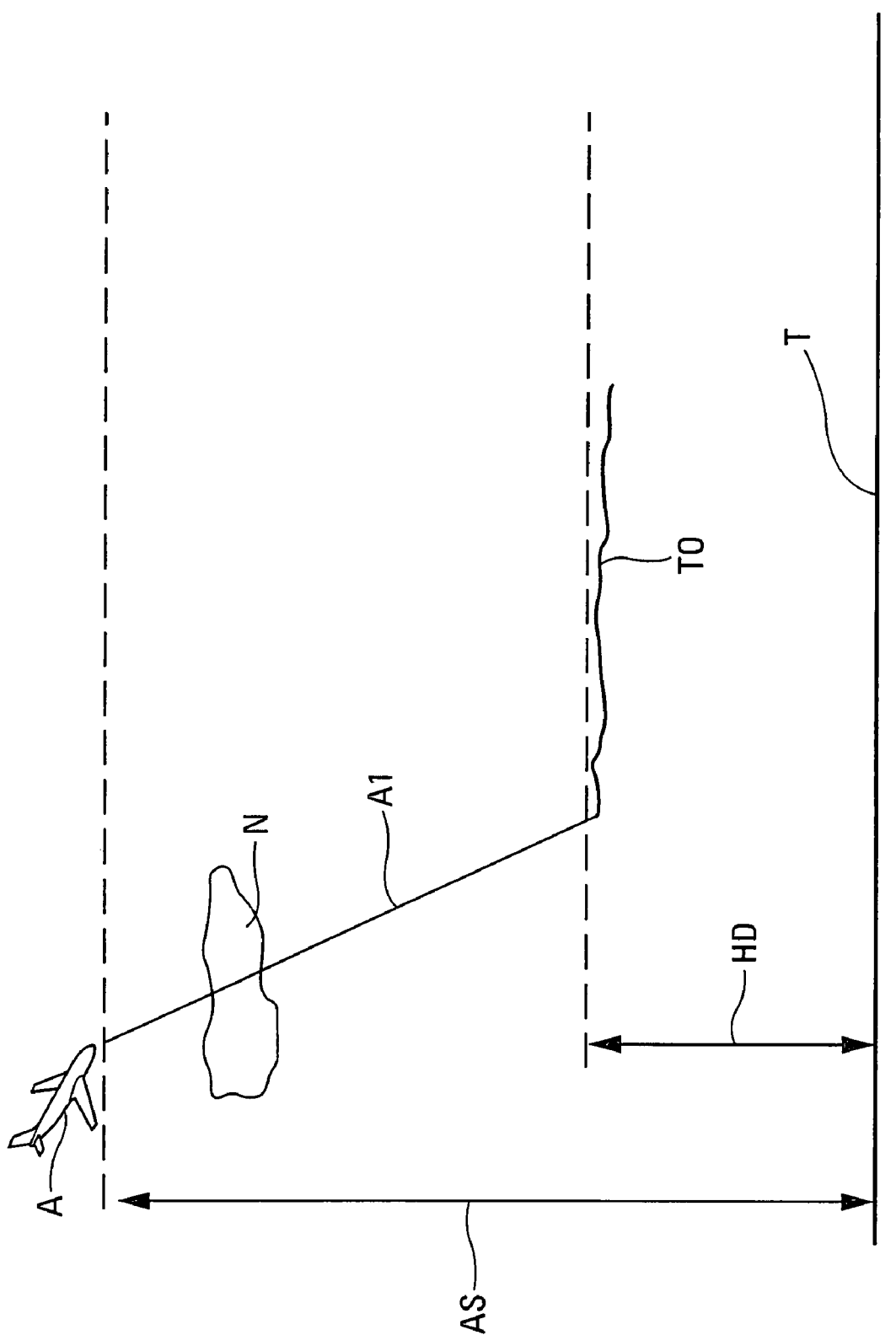

To do this, said device 1 which is on board the aircraft A, comprises, according to the invention:
- a set 2 of the usual information sources, not detailed any further;
- data processing means 3, for example a flight management system (FMS) which are formed so as to determine, exclusively using information obtained from said set 2 of information sources, to which they are linked via a link 4, a descent axis A1 making it possible for the aircraft A to fly from the safe altitude AS to the decision height HD, and, where appropriate, a reascent axis A2 making it possible to fly from said decision height HD to said safe altitude AS. Said descent axis A1 and said reascent axis A2 which are represented in FIG. 2, are formed so as to be secured relative to the ground T being flown over, that is, they are formed so that an aircraft A which follows one of said axes A1, A2, presents a risk of collision with the ground T being flown over (that is, directly with the ground, or even with a structure or an element located on the ground) which is virtually zero, and in any case presents a probability less than a very low predetermined value, for example $10^{-9}$;
- a guidance system 5 which is linked via links 6 and 7 respectively to said set 2 and said means 3, which comprises for example, an automatic pilot 8 and/or a flight director 9, and which is formed to assist in the guiding of the aircraft A:
  - along said descent axis A1, in said descent phase, and this to said decision height HD; and
  - where appropriate, if visual meteorological conditions (VMC) are not verified at said decision height HD at the end of the descent phase, along said ascent axis A2 to said safe altitude AS, as represented in FIG. 2; and
- normal manual piloting means 10 which comprise, for example, a normal control column and which enable the pilot to guide the aircraft A manually at least from said decision height HD, if visual meteorological conditions (VMC) are verified at said decision height HD, as represented in FIG. 3.

It will be noted that, in the context of the present invention, a (secured) reascent axis A2 is not necessarily provided. In this case, if, at the decision height HD, the visual meteorological conditions are not verified, the pilot has the aircraft A reascend straight ahead of him with a maximum thrust, and with the maximum gradient that the aircraft A can fly at with this maximum thrust, and this as far as the safe altitude AS.

In one preferred embodiment, said guidance system 5 comprises the following means, not specifically represented:
- a calculation means which is intended to determine in the normal manner the piloting set points, based on information received from said means 3 via the link 7 and from said set 2 via the link 6;
- at least one means to assist in the piloting, for example an automatic pilot device 8 and/or a flight director 9, which determines, from piloting set points received from said calculation means, instructions for piloting the aircraft; and
- means of activating controlled units, such as, for example, control surfaces (rudder, elevator, etc.) of the aircraft, to which the duly determined piloting instructions are applied.

Thus, with the device 1 according to the invention, all the part of the flight concerned (between the safe altitude AS and the decision height HD) is secured. In practice, in the descent phase, the aircraft A is guided along said descent axis A1 which is, by definition, secured relative to the ground T being flown over. Furthermore, at said safe altitude AS, the aircraft A is likely to be guided in visual flight mode if the meteorological conditions allow the pilot sufficient visibility. Otherwise, it is guided along said reascent axis A2 which is also secured relative to the ground T being flown over, and this as far as the safe altitude AS at which there is no longer any danger of collision with the ground T being flown over.

In the example of FIG. 2, the aircraft A is guided from the safe altitude AS to the decision height HD along the descent axis A1 which is determined by said means 3, using said guidance system 5. At said decision height HD, the visual meteorological conditions are not verified, in particular because of the presence of clouds N between this height HD and the ground T being flown over. Also, in this case, the guidance system 5 causes the aircraft A to fly along said reascent axis A2 (also determined by said means 3) to the safe altitude AS, where it is once again safe.

On the other hand, in the example of FIG. 3, the visual flight conditions are present at said decision height HD so that the aircraft A is then guided using said manual guidance means 10 along a trajectory T0 which is representative of the planned mission, for example a flight at low altitude or a landing. Naturally, the guiding of the aircraft A from the decision height HD can also be performed automatically, in managed mode for example.

The device 1 according to the invention further comprises display means 11 which are linked via the link 12 to said means 3 and which can present indication means (not represented) on a display screen 13.

In particular, to inform the pilot in the descent phase, said display means 11 can present on the display screen 13:
  a first indication means indicating the actual implementation of said descent phase along said descent axis A1; and
  a second indication means indicating said decision height HD.

In one particular embodiment:
  to determine said descent axis A1, said means 3 determine:
    a first anchoring point located on the ground;
    a first magnetic orientation; and
    a first gradient value;
  to determine said reascent axis A2, said means 3 determine:
    a second anchoring point located on the ground;
    a second magnetic orientation; and
    a second gradient value.

Furthermore, in one particular embodiment, said means 3 also determine a set-point speed at which the aircraft A must fly at least along said descent axis A1, and said guidance system 5 guides said aircraft A along said axis A1 by making it fly at said set-point speed.

The present invention can be applied to different types of descent phases, and in particular to a descent phase intended simply to pass through cloud layers. However, in one preferred embodiment, said descent phase is an approach phase of a parachute drop trajectory TP, from which a parachute drop must be made from the aircraft A.

Figure 4:
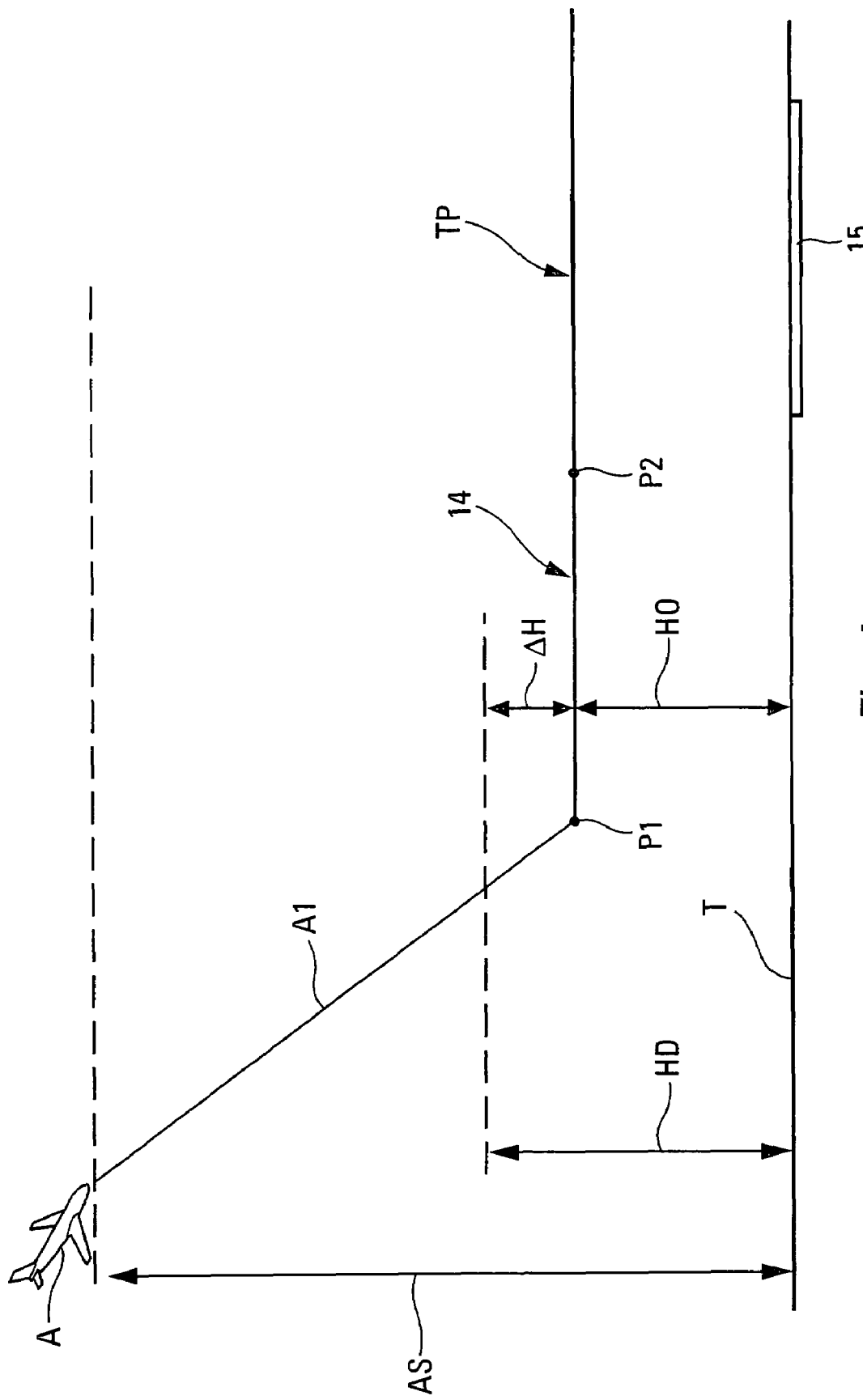

In this preferred embodiment, represented in FIG. 4, said decision height HD corresponds to the sum of the height H0 of the parachute drop trajectory TP which is in principle at constant altitude and a predetermined margin ΔH, for example 100 feet, approximately 30 meters). In one particular variant, this margin ΔH can be zero.

Furthermore, in this preferred embodiment relating to a parachute drop, said set-point speed is adapted to the speed required for the parachute drop which must be carried out from said parachute drop trajectory TP.

Furthermore, to facilitate the parachute drop, said display means 11 present on the display screen 13, in the descent phase along said descent axis A1, at least one additional indication means indicating the moment at which the crew must open the doors and the parachute drop ramp from the aircraft A for the purpose of the parachute drop, and, where appropriate, the moment when the aircraft A must be set to aerodynamic configuration.

Thus, during a flight, to perform a parachute drop, the pilot uses a man-machine interface of the means 3 to insert a parachute drop section in the flight plan. From this parachute drop section which begins at a fixed point, the pilot has the possibility of selecting an independent approach which is saved in a database of the aircraft. The means 3 then determine the descent axis A1 and the reascent axis A2, in particular based on information extracted from this database which is part, for example, of said set 2 of information sources. Said means 3 also determine, according to conditions required for the parachute drop phase, the set-point speed of the approach, and they calculate the moment at which the doors and the parachute drop ramp must be opened by the crew. The guiding along the descent axis A1 is handled in the usual manner by the guidance system 5, for example automatically by the automatic pilot device 8 or manually by a pilot using the flight director 9.

With the invention, the descent can be made in IMC conditions while being secured relative to the ground T. Furthermore, display means 11 can indicate to the crew that it is in an independent descent mode so that it is aware that the aircraft A is using a secured guidance. During the descent along the descent axis A1, the display means 11 indicate to the crew the moment at which it must open the doors and the parachute drop ramp. Said display means 11 also indicate to the crew the value of the decision height HD which should be located at a height margin ΔH above the altitude H0 of the parachute drop trajectory TP. At this decision altitude HD, the aircraft should be in visual meteorological conditions to be able to continue to descend to a point P1 marking the start of the parachute drop phase. Otherwise, the pilot must perform a go-around and have the aircraft A reascend to the safe altitude AS along said reascent axis A2.

At the point P1 marking the start of the parachute drop phase, the guidance automatically switches over to a less secured guidance which makes it possible to follow a trajectory that varies. The aircraft A is first guided along an alignment segment 14, either manually using manual piloting means 10, or, where appropriate, automatically in managed mode. On this alignment segment 14, the means 3 adapt the position of an alignment point, in particular according to measured wind conditions. The guidance is provided according to an objective that fluctuates. For this, the aircraft A must therefore be in visual meteorological conditions. At the point P1, the aircraft A therefore captures the parachute drop altitude H0 and laterally follows the variations of the alignment point to a point P2 marking the start of the parachute drop trajectory TP. Having arrived on the parachute drop trajectory TP, the parachute drop can be made above a parachute drop zone 15 located on the ground.

The invention claimed is:

1. A method to assist in the piloting of an aircraft, said method comprising:

assisting in the independent piloting of the aircraft at least in a descent phase between a safe altitude and a decision height that are predetermined, by determining, using exclusively information available on board the aircraft, a descent axis making it possible to fly from the safe altitude to the decision height; and guiding the aircraft, in said descent phase, along said descent axis to said decision height, wherein:

the determining of the descent axis comprises securing the descent axis relative to the ground being flown over; and if, at said decision height, visual meteorological conditions are not verified, the aircraft is guided to said safe altitude, wherein:

the method further comprises:

determining a reascent axis to enable the aircraft to fly from said decision height to said safe altitude, said reascent axis being secured relative to the ground being flown over, and the guiding of the aircraft to said safe altitude comprises guiding the aircraft along said reascent axis to said safe altitude, wherein:

the determining of the reascent axis is based on determining an anchoring point located on the ground, a magnetic orientation, and a gradient value;

the securing of the descent axis and the reascent axis comprises forming the descent axis and the reascent axis such that a probability of a collision between the aircraft and the ground when the descent axis and the reascent axis are used to guide the aircraft is no greater than $1 \times 10^{-9}$;

said descent phase is an approach phase of a parachute drop trajectory, from which a parachute drop must be carried out;

in the descent phase, there is presented to a pilot of the aircraft, on at least one display screen, at least one indication unit indicating a moment at which a crew must open doors and a parachute ramp of the aircraft for the purpose of the parachute drop;

the determining of the descent axis further comprises determining a set-point speed at which the aircraft should fly at least along said descent axis;

the guiding of the aircraft to said safe altitude comprises guiding the aircraft by making the aircraft fly at said set-point speed;

said set-point speed is adapted to a speed required for the parachute drop that must be carried out from the parachute drop trajectory;

said decision height corresponds to a sum of a height of said parachute drop trajectory which is at constant altitude and a predetermined height margin; and a data processing unit determines the descent axis and the reascent axis based on a set of information sources.

2. A device to assist in the piloting of an aircraft, to assist in the independent piloting of the aircraft at least in a descent phase between a safe altitude and a decision height that are predetermined, wherein the device determines, exclusively using information available on board the aircraft, a descent axis making it possible to fly from the safe altitude to the decision height; and in said descent phase, the aircraft is guided along said descent axis to said decision height, wherein: the determining of the descent axis comprises securing the descent axis relative to the ground being flown over; and it at said decision height, visual meteorological conditions are not verified, the aircraft is guided to said safe altitude, the device comprising:

a data processing unit that determines a reascent axis to enable the aircraft to fly from said decision height to said safe altitude, said reascent axis being secured relative to the ground being flown over; and a guidance system that guides the aircraft to said safe altitude by guiding the aircraft along said reascent axis to said safe altitude, wherein:

the determining of the reascent axis is based on determining an anchoring point located on the ground, a magnetic orientation, and a gradient value, the securing of the descent axis and the reascent axis comprises forming the descent axis and the reascent axis such that a probability of a collision between the aircraft and the ground when the descent axis and the reascent axis are used to guide the aircraft is no greater than $1 \times 10^{-9}$, said descent phase is an approach phase of a parachute drop trajectory, from which a parachute drop must be carried out, in the descent phase, there is presented to a pilot of the aircraft, on at least one display screen, at least one indication unit indicating a moment at which a crew must open doors and a parachute ramp of the aircraft for the purpose of the parachute drop, the determining of the descent axis further comprises determining a set-point speed at which the aircraft should fly at least along said descent axis, the guiding of the aircraft to said safe altitude comprises guiding the aircraft by making the aircraft fly at said set-point speed, said set-point speed is adapted to a speed required for the parachute drop that must be carried out from the parachute drop trajectory, said decision height corresponds to a sum of a height of said parachute drop trajectory which is at constant altitude and a predetermined height margin, and the data processing unit determines the descent axis and the reascent axis based on a set of information sources.

3. The device of claim 2, further comprising a manual piloting unit making it possible for the pilot to guide the aircraft manually at least from the decision height, if the visual meteorological conditions are verified at said decision height.

4. The device of claim 2, further comprising a display unit to present the at least one indication unit on the at least one display screen.

5. An aircraft comprising the device specified by claim 2.

6. The device of claim 2, further comprising:

a man-machine interface by which the pilot inserts a parachute drop section in a flight plan, wherein:

the parachute drop section begins at a fixed point, and the pilot selects an independent approach, which is saved in a database, for the parachute drop section.

* * * * *